United States Patent [19]

Recker

[11] 4,031,386

[45] June 21, 1977

[54] OPTICAL TRANSDUCER ENCODING APPARATUS

[75] Inventor: Gary B. Recker, Cedar Rapids, Iowa

[73] Assignee: Rockwell International Corporation, El Segundo, Calif.

[22] Filed: June 15, 1976

[21] Appl. No.: 696,240

[52] U.S. Cl. .............................. 250/230; 235/92 V; 340/347 P; 340/204; 250/570; 250/231 SE; 250/578

[51] Int. Cl.[2] ...................... G01D 5/36; G06K 7/10

[58] Field of Search ......... 250/230, 231 R, 231 SE, 250/231 G, 229, 215, 216, 570, 566, 578; 235/92 EV, 92 V, 61.11 E; 340/188 R, 188 CH, 201 P, 190, 204, 347 P

[56] References Cited

UNITED STATES PATENTS

| 3,027,551 | 3/1962 | Laurin | 340/188 R |
|---|---|---|---|
| 3,518,652 | 6/1970 | Dransfield et al. | 340/188 R X |
| 3,733,493 | 5/1973 | McClelland | 250/570 X |
| 3,959,628 | 5/1976 | Haydon | 235/61.11 E |

Primary Examiner—Alfred E. Smith
Assistant Examiner—Charles F. Roberts
Attorney, Agent, or Firm—Bruce C. Lutz; Robert J. Crawford

[57] ABSTRACT

An optical transducer encoding system for use with mechanical counting means such as intermittent movement type counting mechanisms is illustrated using a stationary support means thereof as a housing for a plurality of transducers which transmit light to reflective means on the web of each one of a plurality indicia wheels and which light is reflected to optical sensors within the stationary support. All the reflective means are at the same radial distance from the hub of the wheel and the transducers provide an encoded electrical output indicative of the indicia readout.

5 Claims, 5 Drawing Figures

|   | 58 | 56 | 54 | 52 |
|---|----|----|----|----|
| 0 | 0  | 0  | 0  | 0  |
| 1 | 1  | 1  | 0  | 1  |
| 2 | 0  | 0  | 0  | 1  |
| 3 | 1  | 0  | 1  | 0  |
| 4 | 0  | 0  | 1  | 0  |
| 5 | 0  | 1  | 0  | 1  |
| 6 | 0  | 1  | 0  | 0  |
| 7 | 1  | 0  | 1  | 1  |
| 8 | 1  | 0  | 0  | 0  |
| 9 | 0  | 1  | 1  | 0  |

OPTICAL TRANSDUCER ENCODING APPARATUS

THE INVENTION

The present invention is generally related to electromechanics and more specifically related to a encoding system for providing electrical signal readout of the position of A wheel relative A support.

While there are many encoding schemes in the prior art, it is believed that the design of the present encoding scheme is unique at least as applied to intermittent movement type mechanical mechanisms in that it requires substantially no additional space because the parts are housed in areas that are normally devoid of function other than support.

It is, therefore, an object of the present invention to provide an improved encoding apparatus.

Other objects and advantages of the present invention may be ascertained from a reading of the specification and appended claims in conjunctin with the drawings wherein:

DETAILED DESCRIPTION

Figure 1:
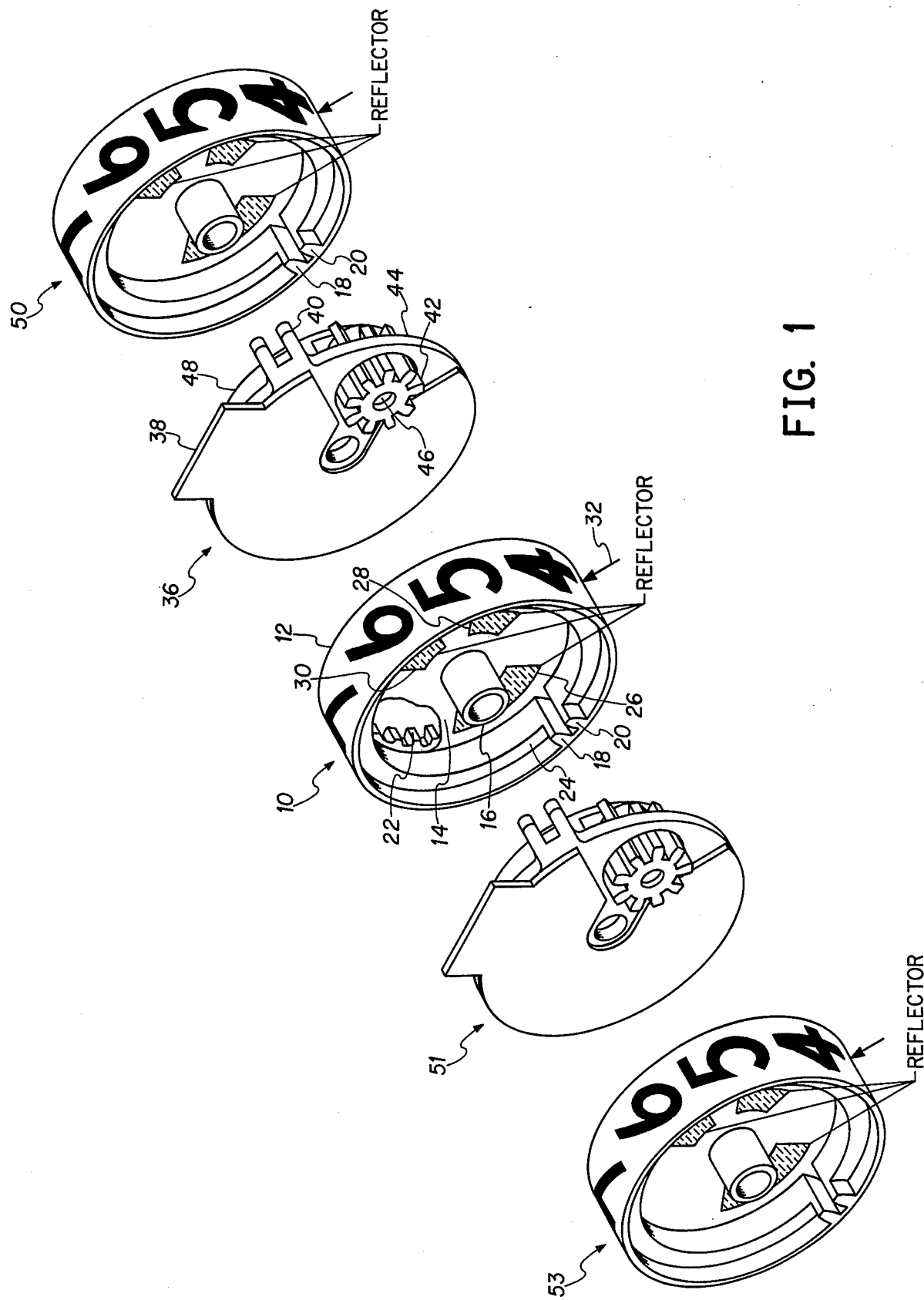
FIG. 1 is an isometric exploded view of portions of two sections of a mechanical counter.
Figure 3:
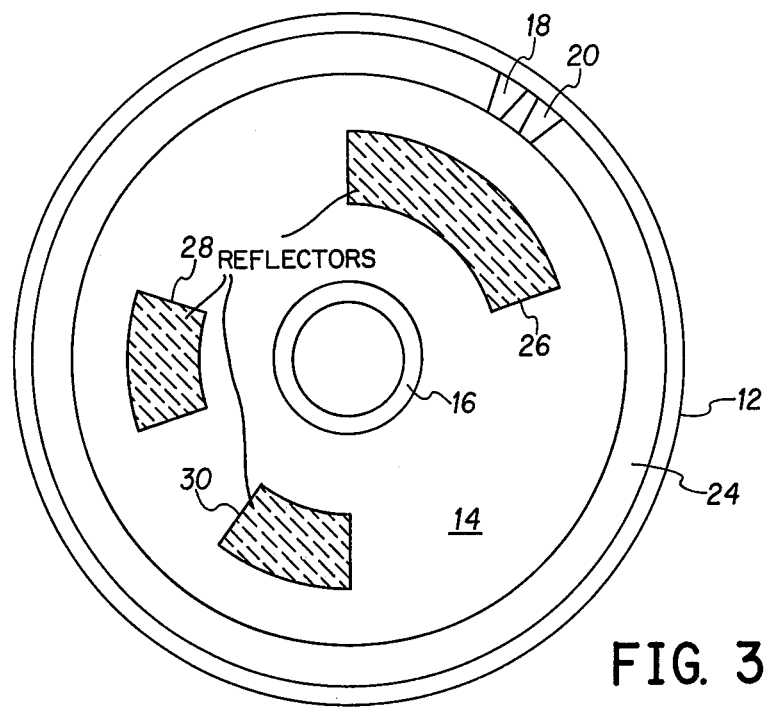
FIG. 3 is a plan view of a wheel of FIG. 1.

In FIG. 1, a first drum or wheel generally indicated as 10 includes a felly or rim portion 12, a web or rim support structure 14 and a hub 16. On an exterior of the felly are a plurality of indicia illustrated as 4 through 7. Other digits are positioned around the rim outside the viewing area. On one interior surface of the rim are a pair of gear teeth 18 and 20 which constitute a partial set of gear teeth to be used to provide a mechanical output signal to a following stage. On the other rim are a plurality of gear teeth 22 which extend completely around the circumference of the interior of felly 12 on the oposite side of the web 14. As will be noted, there is a locking ring 24 which separates a thin portion of the felly 12 and a thicker portion to which the web 14 is attached. Further, there appears on web 14 a plurality of reflective surfaces designated as 26, 28 and 30. An arrow 32 illustrates the viewing angle for one embodiment of the invention. A support mechanism or transfer plate 36 includes a plate 38 which in the embodiment shown comprises printed circuit board material having printed circuit paths (not shown in FIG. 1, but shown in detail in FIG. 4). Further illustrated is an arm 40 and a gear 42. Gear 42 has a partial set of teeth on one end which cooperates with locking ring 24 and gear teeth 18 and 20 of the wheel. The locking ring 24 prevents gear 42 from rotating except when gear teeth 18 and 20 mesh with gear 42. Gear 42 extends through both surfaces of a plate 44 to which the printed circuit board 38 is attached. The gear rotates on an axial shaft 46 attached to support 36 on the right hand end (not shown). Although not specifically illustrated, a shaft extends through the hub 16 and center hole of transfer plate 36 to provide a bearing or support surface for the wheel and transfer plate. A further wheel designated as 50 has parts identical with that described in connection with wheel 10 and further references to wheel 50 will use the same individual part designations as used in connection with wheel 10. In FIG. 3, the plan view of the wheel 10 is given the same designations as used in connection with FIG. 1. A further support or transfer plate 51 is shown for transferring an indication of the number of rotations of wheel 10 to a higher order stage wheel 53. As will be realized, wheel 10 constitutes a higher order stage as compared to wheel 50.

Figure 4:
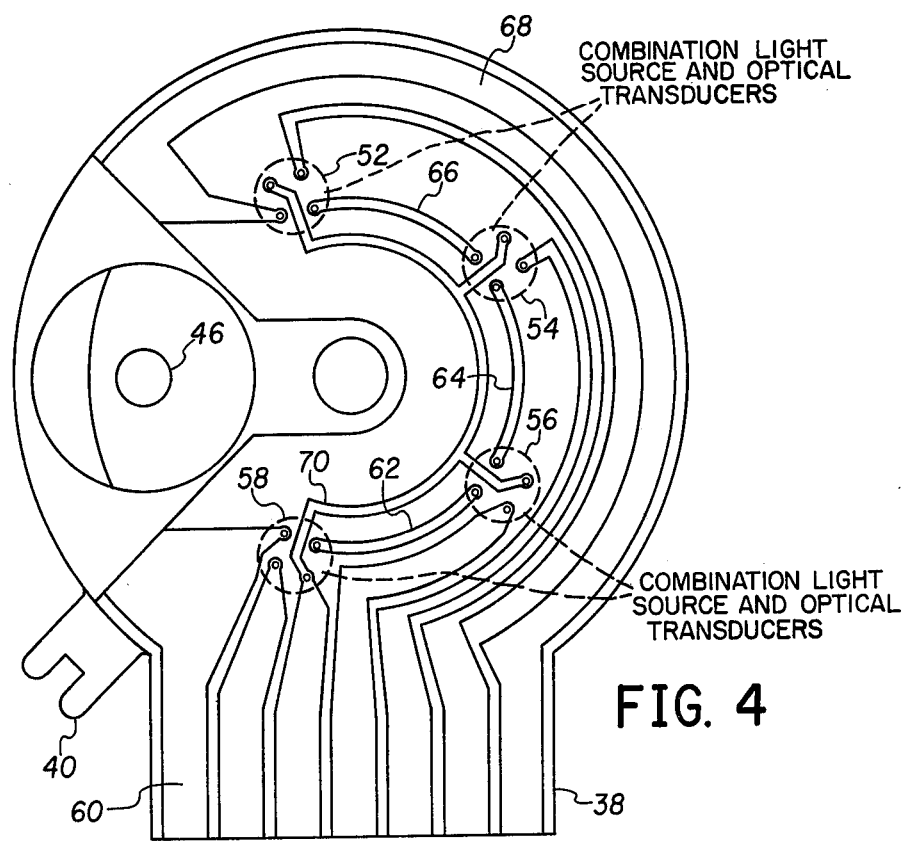
FIG. 4 is a plan view of the transfer plate or support of FIG. 1.

In FIG 4, the transfer plate of FIG. 1, is illustrated in more detail. However, parts illustrated in FIG. 1 are given the same designation in FIG. 4. A plurality of dash line indications 52, 54,56 and 58 represent optical transducers. These optical transducers are at the same radial distance from the hub as are the reflective areas 26, 28 and 30. A first printed circuit path 60 supplies current to one terminal of an LED light source within optical transducer 58. This LED is tied in series with LED's in the other transducers by circuit paths 62, 64, 66 and 68. A circuit path 70 connects all of the collectors of the phototransistors together and the remaining circuit paths are used to connect to each of the individual emitters of the phototransistors within the optical transducers. To provide binary electrical output signals therefrom. To obtain an output signal from a phototransistor, the emitter thereof may be tied through a resistor to ground and an output terminal connected to the emitter. The emitter potential will change with reflected light levels. Such a circuit including a LED light source 52', a reflector 26', a transistor 52", and a resistor 75 is represented in FIG. 5.

Figures 2, 5:
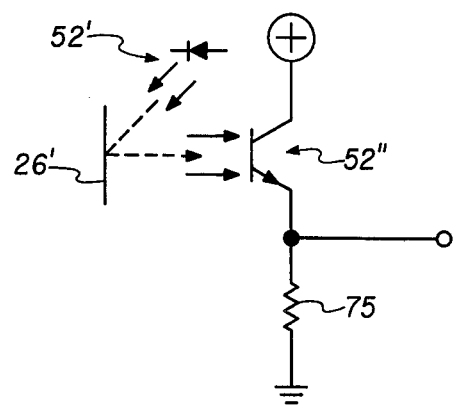
FIG. 2 is a table showing the readout from transducers used in the encoding mechanism of FIG. 1.
FIG. 5 is an exemplary schematic representation of a combination light source and transducer readout.

FIG. 2 contains a plurality of columns labeled 58, 56, 54 and 52 representative respectively of the outputs of corresponding transducers while the rows are labeled with the digits 0 through 9. The 0's and 1's in the table represent a logic 0or logic 1output as would be lbtained from the phototransistors for each position of a wheel containing the reflective means,and the transducers in the positions shown in FIG. 3 and 4 for each digit position as represented by the indicia felly 12. In other words, if the wheel 10 were observed from the line of sight 32 when a 0appeared in this line of sight, the transducers and the reflective areas would all be offset so that there would be no reflective material in the line of sight of the transducers and accordingly all logic 0 output. If on the other hand, when a 3 is in the line of sight as illustrated in FIG. 1, the reflective areas are lined up such that transducer 58 receives a reflection off from reflective area 30 while transducer 54 receives a reflection off reflective area 26. Thus, these two transducers provide logic 1 outputs. From this explanation, the remaining encoded outputs will be apparent.

In operation, the wheel 50 and the transfer plate 36 provide one section of an intermittent motion or movement type mechanical counting means. Typically, a plurality of these sections are connected together to form a multidigit readout such as may be found in the odometer of an automobile. Only ½ sections are illustrated because it is believed that this will clearly illustrate the operation. A mechanical signal input in the form of a gear drive operates on the teeth 22 of wheel 50 to rotate this wheel. As the teeth 18 and 20 contact gear 42, the motion of wheel 50 transmits mechanical signals through gear 42 to advance the wheel 10 by one digital increment with said transfer plate 36 being held stationary. As will be noted, the gear teeth 18 and 20 are located with respect to the 0 digit so as to advance wheel 10 as the wheel 50 is changing from the 9 digit to the 0 digit at the viewing angle.

The operation of this type of mechanical counter is well known to those skilled in the art and is variously termed geneva-like mechanical counting means or intermittent movement type mechanical counting means.

While for some applications of the invention, electrical contacts could be used between web 14 and detection means within transfer plate 36 to practice the invention, the preferred embodiment utilized optical means to reduce mechanical drag and thus lower the power requirements of the driving means. Also, some applications of the inventive concept could use magnetized areas on the web 14 and magnetic sensors within transfer plate 36. However, the materials may cause interference with adjacent electrical circuitry. Thus, the apparatus illustrated is considered to be a preferred embodiment of the inventive concept.

Since various alterations and changes, such as those suggested above, will be apparent to those skilled in the art, I wish to be limited only by the scope of the invention as defined in the appended claims.

What is claimed is:

1. Conversion apparatus for providing a visual and binary coded electrical output indication of the number of revolutions of a geared mechanical input wherein an indicating section includes:
    a plurality of wheels each having a hub, a connecting web and a felly with indicia on an outer surface, a continuous set of gear teeth on an inner surface on one side of the web and a partial set of gear teeth on the inner surface on the other side of the web to drive further conversion sections, and
    a plurality of stationary members, one for each wheel and mounted intermediate said wheels, cooperating with said wheel to provide a bearing surface for a gear operable to mesh with the partial set of gear teeth of the present section and the continuous set of gear teeth of an adjacent further section, the improvement comprising:
    a plurality of reflective surfaces situated on said web, each of said surfaces being located at the same radial distance, and
    a plurality of optical transducers, including light sources, in said stationary member for detecting and outputting encoded binary digital signals indicate of individual ones of several possible rotational positions of said wheel relative to said stationary member.

2. Encoding apparatus for use with intermitting movement type mechanical counting and visual indicating means comprising, in combination:
    a plurality of rotatable wheel means each including hub, web and felly portions;
    a plurality of stationary means, one of each being positioned intermediate adjacent stages of said wheel means and cooperating with said wheel means for providing intermittent mechanical output signals to higher order stages; and
    a plurality of optical sensor means incorporating in each of said stationary means for detecting the position of said wheel means relative said stationary means and outputting encoded binary digital electrical signals indicative of said position.

3. Apparatus as claimed in claim 2 comprising, in addition:
    indicia on said felly portion of said wheel means, and
    reflective means on said web portion of said wheel means with all of said reflective means located at the same radial distance from said hub portion.

4. Apparatus as claimed in claim 3 wherein said sensor means are optical transducers incorporating LED light sources.

5. Position encoding apparatus for use in electrically determining the angular position of a plurality of wheels with respect to a intermediately situated stationary support members, comprising, in combination:
    a plurality of rotatable wheel means including hub, web and felly portions;
    a plurality of reflective means on each wheel, each reflective means being located on said web portion at the same distance from said hub portion;
    a plurality of optical transducer means mounted on each of the support members for transmitting light toward said web means, detecting reflected light as returned by said plurality of reflective means, and providing binary digital encoded output signals indicative of the rotational position of said wheel means relative to said transducer means.

* * * * *

UNITED STATES PATENT AND TRADEMARK OFFICE
CERTIFICATE OF CORRECTION

PATENT NO. : 4,031,386
DATED : June 21, 1977
INVENTOR(S) : Gary B. Recker

It is certified that error appears in the above-identified patent and that said Letters Patent are hereby corrected as shown below:

IN THE SPECIFICATION

Column 1, line 4, delete "A" (two instances) and substitute therefor --a--;

line 61, after "gear" insert --42--;

Column 2, line 24, delete ". To" and substitute therefor --to--;

line 37, delete "0or" and substitute therefor --0 or--; and, same line delete "1btained" and substitute therefor --obtained--;

line 43, delete "0appeared" and substitute therefor --0 appeared--;

line 59, delete "1/2" and substitute therefor --one and one-half--.

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*